United States Patent [19]

Della-Donna

[11] 4,157,638

[45] Jun. 12, 1979

[54] BUILDING PANEL AND UTILIZATION THEREOF

[75] Inventor: Alphonse Della-Donna, Fort Lauderdale, Fla.

[73] Assignee: Thermo-Core Building Systems, Inc., Fort Lauderdale, Fla.

[21] Appl. No.: 839,037

[22] Filed: Oct. 3, 1977

[51] Int. Cl.² .......................... E04B 1/16; E04C 2/10
[52] U.S. Cl. ................................. 52/173 R; 52/309.9; 52/381; 52/405; 52/592
[58] Field of Search .................. 52/419, 420, 592, 71, 52/265, 264, 309.9, 518, 619, 173, 71, 309.4, 309.7; 428/121, 322, 314, 318, 321

[56] References Cited

U.S. PATENT DOCUMENTS

| | | | |
|---|---|---|---|
| 3,000,144 | 9/1961 | Kitson | 52/309.11 |
| 3,111,787 | 11/1963 | Chamberlain | 52/420 |
| 3,118,186 | 1/1964 | Moss | 52/71 |
| 3,153,817 | 10/1964 | Pease | 52/619 |
| 3,353,314 | 11/1967 | Melcher | 52/309.11 |
| 3,420,023 | 1/1969 | Gregori | 52/309.9 |
| 3,786,613 | 1/1974 | Shepheard | 52/619 |
| 3,854,260 | 12/1974 | O'Hanlon | 52/309.8 |
| 4,074,492 | 2/1978 | Simpson | 52/419 |

FOREIGN PATENT DOCUMENTS 1344215 10/1963 France ................................ 52/309.8

Primary Examiner—John E. Murtagh
Attorney, Agent, or Firm—Cushman, Darby & Cushman

[57] ABSTRACT

A building structure and a method of constructing a wall utilizing the building structure, for the construction of concrete buildings in a simplified manner. Each building structure unit includes a pair of exterior panels of cardboard sandwiching an insulating foam panel, or sandwiching two foam panels which in turn sandwich another cardboard panel. The various panels are glued together, and tabs extend from the exterior panels along the bottom of the structure, and along one side of the structure. A number of the structures are stood in place so that they extend vertically, with the tab portions along their bottoms attached to the building base, and the structures all arranged side by side in interlocking engagement to provide a continuous self-supporting wall structure providing a horizontally impenetrable barrier. Reticulated metal reinforcing material is attached to each opposed exterior face of the wall structure, and cementitious material is sprayed onto each exterior face to form a wall with no cementitious material extending between the exterior faces.

8 Claims, 5 Drawing Figures

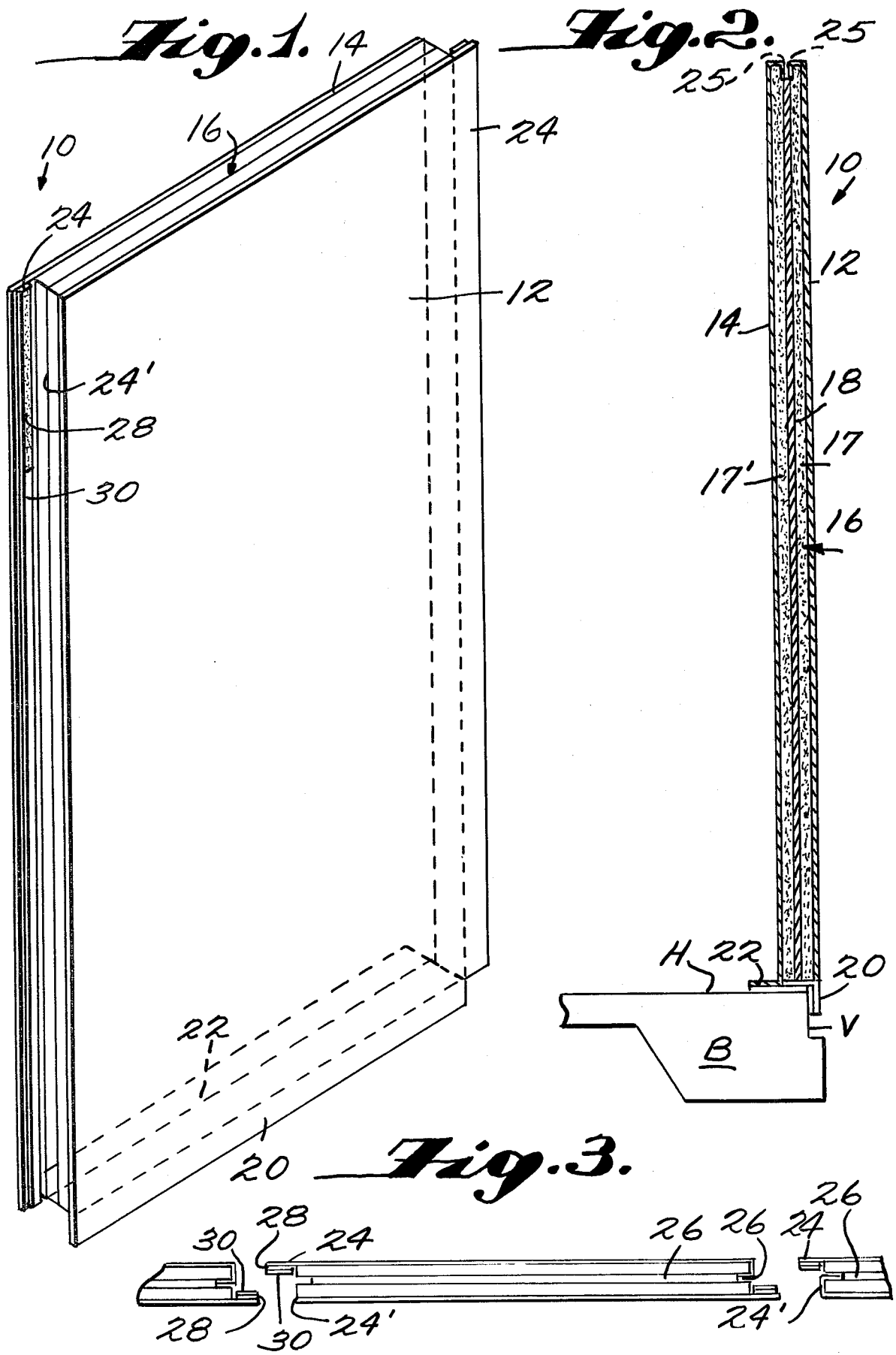

U.S. Patent Jun. 12, 1979 Sheet 2 of 2 4,157,638
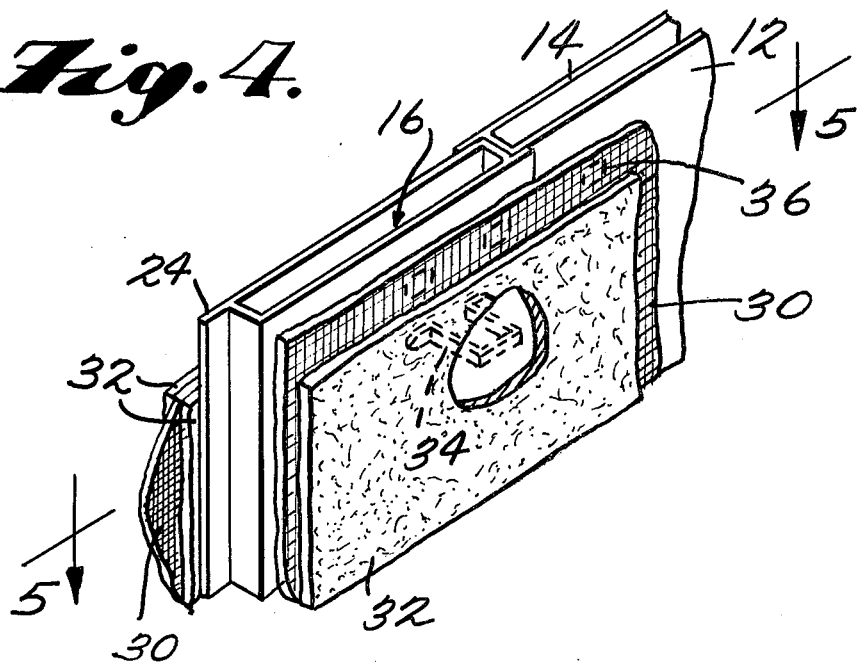
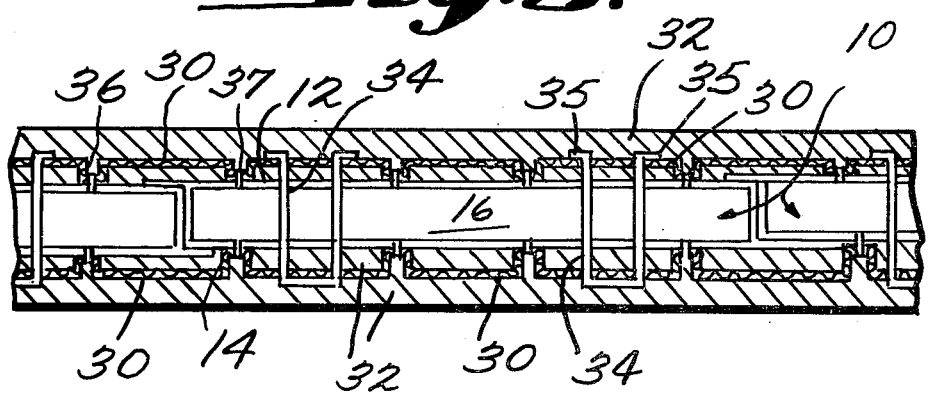

BUILDING PANEL AND UTILIZATION THEREOF

BACKGROUND AND SUMMARY OF THE INVENTION

The invention relates to a building structure for use in the construction of concrete buildings, and a method of utilization of the building structure to construct concrete buildings having improved properties over conventional buildings, in a simple and inexpensive manner. In U.S. Pat. No. 3,982,368 a building system was disclosed for the first time that allowed practical, rapid, inexpensive construction of concrete buildings. In that patent, a number of hollow core members were arranged vertically in a generally self-supporting arrangement, lathing was applied to either exterior face of the core member, and cementitious material sprayed thereon to provide the final construction. It is the primary object of the present invention to provide a resulting structure having all of the advantages of a structure constructed in accordance with the teachings of U.S. Pat. No. 3,982,368 that has structural units that are more susceptible to factory manufacture when particularly good thermal insulating qualities of the building to be constructed are desired. While the core members of U.S. Pat. No. 3,982,368 may have foam disposed in the hollow vertical cavities thereof, such structures do not necessarily lend themselves to ready factory manufacture of such members while retaining ease of assembly in the field. According to the present invention, a building structure is provided that includes a pair of exterior quadrate panels formed of stiff lightweight relatively inexpensive material (such as cardboard) and an interior quadrate panel of insulating material having a generally foam structure (i.e. polystyrene foam or polyurethane foam), of generally the same width and length as each of the exterior panels. The panels are glued or otherwise attached together, and the exterior panels have tab portions along a first edge thereof extending past the termination of the interior panel, and at least one of the exterior panels has a tab portion along a second edge thereof extending past the termination of the interior panel, the second edge being perpendicular to the first edge. The tab portions along the first edge are adapted to be attached to vertical and horizontal ledge portions of a base on which the building is to be constructed, and the tab portions along the second edge interlock with adjacent panels to provide a self-supporting horizontally impenetrable barrier.

For ease of shipment and to provide greater flexibility, preferably tab portions are formed along all edges of the exterior panels, and grooves are formed in the interior panel along all the edges thereof, the exterior tabs being foldable over so that they can be inserted in the grooves so that no exterior tab portions are provided during shipping. An interior cardboard panel can be provided between two interior form panels, with the grooves formed along the perimeter of the interior cardboard panel.

According to the method of the present invention, a plurality of the quadrate structures according to the invention are stood in place so that they extend vertically with tab portions provided along the bottom thereof. The bottom tab portions are affixed to the horizontal and vertical ledge portions of the base, as by gluing or nailing, and the length portions of the structures are brought into abutting engagement with each other to provide a continuous self-supporting wall structure providing a horizontally impenetrable barrier. Reticulated sheets of metal reinforcing material are attached to the opposing exterior faces of the wall structure, and cementitious material is sprayed onto the opposing exterior faces to ultimately form a wall having a pair of reinforced cementitious material wall slabs spaced by a wall structure of cardboard and foam, with no cementitious material extending between the cementitious material wall slabs.

The primary object, and other objects of the invention, will become clear from an inspection of the detailed description of the invention, and from the dependent claims.

BRIEF DESCRIPTION OF THE DRAWINGS

FIG. 1 is a perspective view of an exemplary quadrate structure (building panel) according to the present invention;

FIG. 2 is a cross-sectional view showing the panel of FIG. 1 assembled in place on a base;

FIG. 3 is a top plan view of a number of panels according to the invention about to be assembled together;

FIG. 4 is a partial perspective view of a section of an exemplary wall constructed according to the present invention; and FIG. 5 is a cross-sectional view taken along line 5—5 of FIG. 4.

DETAILED DESCRIPTION OF THE DRAWINGS

A building structure according to the present invention is shown generally at 10 in the drawings. The structure 10 includes a pair of exterior substantially quadrate panels 12, 14, each panel formed of stiff lightweight relatively inexpensive material (cardboard, paperboard, or the like) with an interior substantially quadrate panel 16 (see FIG. 3) formed of insulated material having a generally foam structure (i.e. a polyurethane foam or a polystyrene foam sheet) of generally the same width and length as each of the exterior panels 12, 14. As shown in FIG. 3, the interior panel 16 may comprise a single foam sheet having the desired thickness, or as shown in FIG. 2, the interior panel 16 may comprise two foam interior panels 17, 17' with an interior panel 18 formed of stiff lightweight relatively inexpensive material disposed therebetween. Means are provided for attaching the interior panel 16 between the exterior panels 12, 14—such as glue, staples, or the like—and similar means are provided for attaching the panel 18 between the two interior foam sheets 17, 17' in that embodiment of the invention.

The exterior panels 12, 14 have tab portions 20, 22 provided along a first edge thereof extending past the termination of the interior panel (see FIGS. 1 and 2), and at least one of the exterior panels 12, 14 has a tab portion 24 along a second edge thereof extending past the termination of the interior panel 16, the second edge being perpendicular to the first edge (see FIG. 1). The tab portions 20, 22 are adapted to be disposed on vertical and horizontal ledges V, H respectively of a concrete base B or the like (see FIG. 2).

For ease of shipment, and in order to provide a great deal of flexibility in assembly, it is desirable to provide tab portions along all four edges of the quadrate exterior panels 12, 14. Such tab portions are shown at 24, 24' along the lengths of the quadrate structure shown in the drawings, and at 25 along the top (see FIG. 2). A groove 26 extends along the edges of the interior panel 16 with which tab portions (24, 24′, 25) are associated, the grooves being dimensioned to receive bent over tab portions of the exterior panels, as shown at 24′ in FIGS. 1 and 3, and at 25 in FIG. 2. A groove may also be provided along the bottom edge of the structure 10 for receipt of the tabs 20, 22 if desirable, in which case the structure 10 would have no protruding tab portions which could be bent or mangled during shipment. In such a case, the workers in the field could then merely unfold the tab portions that were desired, while leaving the other tab portions tucked in. When an interior stiff material panel 18 is provided, that panel may be provided with dimensions slightly less than the dimensions of the foam panels 17, 17′ so that grooves were inherently provided between the panel 17, 17′ along the edges thereof (see the top of the structure 10 in FIG. 2).

Additionally, in order to facilitate interlocking engagement between the adjacent panels, the tab portions 24 (and/or 24′) of at least some of the structures 10 may be provided with an adhesive on the interior face thereof. The adhesive—which preferably is a pressure sensitive adhesive—is shown with exaggerated thickness in FIG. 3 at 28, the adhesive being covered by a release paper 30 or the like. In some circumstances, it will also be desirable to provide an adhesive with or without release paper coating along the tabs 20, 22 interior surfaces.

A method of constructing a wall of a given height on a base B, according to the present invention, is most readily seen by an inspective of FIGS. 2, 4, and 5. A plurality of the quadrate structures 10 are formed, at least some of the structures having tab portions 24 along the length edge thereof adapted to interlock with other quadrate structures 10. One then stands each of the quadrate structures 10 in place so that it extends vertically (FIGS. 2 and 4) with the width edge having tab portions 20, 22 therealong positioned on the bottom. The tab portions 20, 22 are then affixed to the base B (as to vertical and horizontal edges V, H respectively) by glue, nails, staples or the like, and the length portions of the structures 10 are brought into abutting engagement with each other (FIGS. 4 and 5) to provide a continuous generally self-supporting wall structure providing a horizontally impenetrable barrier of the height of a wall to be constructed thereby having opposed spaced substantially continuous exterior faces. Reticulated sheets 30 of metal reinforcing material are attached in substantially parallel spaced relation to each of the opposed exterior faces of the wall structure, and cementitious material 32 is then applied to the wall structure through and around each of the sheets 30 to form a wall having a pair of reinforced cementitious material wall slabs faced by a wall structure of cardboard and foam, with no cementitious material extending between the cementitious material and the wall slabs. The step of attaching adjacent panels together in interlocking relationship may be facilitated by removing the release paper 30 from the adhesive 28 on tabs 24, and pressing the adhesive face of each tab portion 24 into engagement with an exterior surface of an adjacent structure 10 exterior panel 12, 14 (see overlapping relationship of FIGS. 4 and 5).

The step of attaching reticulated sheets 30 of metal reinforcing material to the opposing exterior faces of the wall structure is preferably accomplished by piercing the reticulated sheets and the wall structure with structural tie members 34. The ties 34 may comprise clips formed of galvanized steel having the shape of a staple and sharpened at the ends 35 thereof so that they are able to pierce through both the sheets 30 and the interior quadrate structure 10, the ends 35 being bent over as indicated in FIG. 5 after piercing the far reticulated sheet 30. Spacer means 36, integrally formed with the exterior panels 12, 14 as protrusions or dimples at predetermined locations, may also be provided for insuring that the reticulated sheets 30 are spaced from the faces of the wall structure. The sheets 30 may be connected to the structures 10 at the protrusions 36 by staples 37 or the like. Alternatively, the spacer means 36 could be provided by squares of wood or plastics or the like.

The cementitious material is preferably applied by spraying, and after spraying the outer surfaces of the wall slabs are finished, and any type of other building materials may be applied to the exterior faces if desired. The quadrate structures are arranged during construction to form the wall structures so that window and/or door frame receiving openings are provided therein, such openings either being provided between adjacent structures 10, or openings being cut (either prior or subsequent to construction of the wall) in the structures 10. Additionally, the method according to the invention can be utilized for constructing buildings of more than one story, merely by repeating all of the steps necessary for a one story construction utilizing the first story wall as the base for the construction of the second story wall. The construction also is not limited to "on site" erection, but lends itself to prefabrication for erection later at the site.

The quadrate structure according to the invention may be readily fabricated at a manufacturing facility, and readily shipped to the site for assembly with other structures to form the building. The provision of the foam insulation insures that the thermal insulating qualities of the structure are excellent—even superior to the walls shown in U.S. Pat. No. 3,982,368 when no foam filling is provided in the cores. Additionally, since the foam is assembled with the rest of the structure and since the foam is in quadrate sheets, a much simpler arrangement is provided for walls with excellent insulation than is the case in U.S. Pat. No. 3,982,368. Also, according to the invention, assembly of the structure in an upright position is facilitated by the provision of the bottom tabs 20, 22, and interlocking between adjacent structures is facilitated by the provision of adhesive right on the tab portions 24. Also, the foldup features of the tabs allows for easy shipment of the structures, and allows great flexibility for assembly in the field.

While the invention has been herein shown and described in what is present considered to be the most practical and preferred embodiment thereof, it will be apparent to those of ordinary skill in the art that many modifications may be made thereof within the scope of the invention, which scope is to be afforded the broadest interpretation of the appended claims so as to encompass all equivalent structures and methods.

What is claimed is:

1. A building structure intermediate construction comprising
    a pair of exterior substantially quadrate panels, each panel formed of stiff lightweight relatively inexpensive cellulosic material,
    an interior substantially quadrate panel, formed of insulating material having a generally foam structure, of generally the same width and length as each said exterior panel, means for attaching said interior panel between said exterior panels, said exterior panels having tab portions along a first edge thereof extending past the termination of said interior panel, at least one of said exterior panels having a tab portion along a second edge thereof extending past the termination of said interior panel, said second edge being a generally perpendicular edge of said exterior quadrate panel to said first edge, an interior substantially quadrate panel of stiff lightweight relatively inexpensive cellulosic material, a second substantially quadrate panel formed of insulating material having a generally foam structure, said interior panel of stiff cellulosic material being disposed between said interior foam structured panels, and said interior panels being sandwiched between said exterior panels, and means for attaching said interior foam structured panels to said interior stiff panel, and to said exterior panels.

2. A building structure comprising a pair of exterior substantially quadrate panels, each panel formed of stiff lightweight relatively inexpensive cellulosic material, an interior substantially quadrate panel, formed of insulating material having a generally foam structure, of generally the same width and length as each said exterior panel, means for attaching said interior panel between said exterior panels, each said exterior panel having bendable tab portions along all four edges thereof extending past the termination of said interior panel, and a groove extending along at least each of two of the edges of said interior quadrate panel for receipt of bent-over tab portions of said exterior panel therein each said groove being constructed so that the tab portions received thereby can be readily removed therefrom.

3. A building structure intermediate nonload bearing construction comprising a pair of exterior substantially quadrate panels, each panel formed of stiff lightweight relatively inexpensive cellulosic material, an interior substantially quadrate panel, formed of insulating material having a generally foam structure, of generally the same width and length as each said exterior panel, means for attaching said interior panel between said exterior panels, said exterior panels having bendable tab portions along a first edge thereof extending past the termination of said interior panel, and the exterior and interior panels being flush along the edge thereof opposite said first edge, all four edges of each of said quadrate exterior panels having tab portions therealong extending past the termination of said interior panel, and a groove extending along at least each of two of the edges of said interior quadrate panel for receipt of bent-over tab portions of said exterior panel therein.

4. A building structure intermediate nonload bearing construction comprising a pair of exterior substantially quadrate panels, each panel formed of stiff lightweight relatively inexpensive cellulosic material, an interior substantially quadrate panel, formed of insulating material having a generally foam structure, of generally the same width and length as each said exterior panel, means for attaching said interior panel between said exterior panels, said exterior panels having bendable tab portions along a first edge thereof extending past the termination of said interior panel, and the exterior and interior panels being flush along the edge thereof opposite said first edge, at least one of said exterior panels having a tab portion along a second edge thereof extending past the termination of said interior panel, said second edge being a generally perpendicular edge of said exterior quadrate panel to said first edge, an interior substantially quadrate panel of stiff lightweight relatively inexpensive material, and a second substantially quadrate panel formed of insulating material having a generally foam structure, said interior panel of stiff material being disposed between said interior foam structured panels, and said interior panels being sandwiched between said exterior panels, and means for attaching said interior foam structured panels to said interior stiff panel, and to said exterior panels.

5. A structure as recited in claim 4 wherein said interior stiff panel has a length and width slightly less than the length and width of said interior foam structured panels, so that a groove is provided between the interior foam structured panels along at least two edges thereof, said grooves having sufficient thickness for receipt of bent-over tab portions of said exterior panels therein.

6. A structure as recited in claim 5 wherein each of said quadrate exterior panels has tab portions along each of the four edges thereof extending past the termination of said interior panels, and wherein grooves are provided between the interior foam structures panels along at least three edges thereof.

7. A building structure intermediate nonload bearing construction comprising a pair of exterior substantially quadrate panels, each panel formed of stiff lightweight relatively inexpensive cellulosic material, an interior substantially quadrate panel, formed of insulating material having a generally foam structure, of generally the same width and length as each said exterior panel, means for attaching said interior panel between said exterior panels, said exterior panels having bendable tab portions along a first edge thereof extending past the termination of said interior panel, and the exterior and interior panels being plush along the edge thereof opposite said first edge, at least one of said exterior panels having a tab portion along a second edge thereof extending past the termination of said interior panel, said second edge being a generally perpendicular edge of said exterior quadrate panel to said first edge, and an adhesive with a release paper covering disposed on the interior face of the tab portion along each exterior panel second edge.

8. A building structure intermediate nonload bearing construction comprising
- a pair of exterior substantially quadrate panels, each panel formed of stiff lightweight relatively inexpensive cellulosic material,
- an interior substantially quadrate panel, formed of insulating material having a generally foam structure, of generally the same width and length as each said exterior panel,
- means for attaching said interior panel between said exterior panels,
- said exterior panels having bendable tab portions along a first edge thereof extending past the termination of said interior panel, and the exterior and interior panels being flush along the edge thereof opposite said first edge,
- at least one of said exterior panels having a tab portion along a second edge thereof extending past the termination of said interior panel, said second edge being a generally perpendicular edge of said exterior quadrate panel to said first edge, and
- wherein said generally foam structured insulating material is selected from the group consisting of polystyrene foam and polyurethane foam.

* * * * *